3,038,873
REACTION PRODUCT OF AN ORGANIC ISO-
CYANATE WITH AN OXYGEN- OR SULFUR-
CONDENSED PETROLEUM HYDROCAR-
BON, METHOD OF MAKING SAME, AND
MIXTURE THEREOF WITH AN EPOXY
RESIN
Franklin I. L. Lawrence, Hedgehog Lane, R.D. 2, and
Richard G. Crumley, 14 Keating Ave., both of Bradford, Pa.
No Drawing. Filed Apr. 16, 1957, Ser. No. 653,057
18 Claims. (Cl. 260—42)

This invention relates to novel compositions of matter useful as components of adhesives, protective coatings, potting compounds, and sealers, and as additives for lubricating oils. More particularly, the invention embraces isocyanate modified oxygen and sulfur condensation products of high molecular weight hydrocarbon materials; and compositions, including adhesives, protective coatings, potting compounds, sealers and lubricating oil compositions containing such modified condensation products.

Various types of condensation products produced by the reaction of relatively high molecular weight hydrocarbons with oxygen and sulfur are known to the prior art. Such condensation products are described, inter alia, in United States Patents Nos. 2,377,336, 2,337,337, 2,337,338, 2,337,339 and 2,732,346.

The present invention contemplates the production of isocyanate modifications of such products which are characterized by physical and chemical properties requisite to the utility thereof as components of coating compositions, adhesives, sealers, potting compounds, and the like. In addition, the modified products contemplated by the invention are useful as lubricating oil additives finding particular application as viscosity index improving agents.

It is a primary object of this invention to provide novel isocyanate modified oxygen and sulfur condensed hydrocarbon products.

It is a further primary object of the invention to provide novel adhesive, coating, and sealing compositions comprising the isocyanate modified oxygen and sulfur condensed hydrocarbon products of the invention.

It is a specific object of the invention to provide compounded coating compositions, adhesives, sealing compositions, lubricating oils, transmission fluids, shock absorber fluids, and the like, containing the isocyanate modified oxygen and sulfur condensed hydrocarbons of the invention.

It is an additional object of the invention to produce infusible, oil-insoluble, isocyanate modified oxygen and sulfur hydrocarbon condensation products useful, inter alia, as adhesives, sealers, and the like.

It is a further important object of the invention to provide novel compositions which can be formed into a desired shape and thereafter thermally set.

It is yet another significant object of the invention to provide novel compositions useful in the production of foamed resinous materials.

It is an additional specific object of the invention to provide isocyanate modified oxygen and sulfur condensed hydrocarbons effective, inter alia, as viscosity index improving agents for oleaginous compositions, including mineral and synthetic lubricating oils and greases.

It is a further object of the invention to provide isocyanate modified oxygen and sulfur hydrocarbon condensation products useful to disperse in adhesives, coating compositions, lubricating oils and the like, additive materials such as barium compounds which are insoluble therein.

It is yet another object of the invention to provide isocyanate modified oxygen and sulfur hydrocarbon condensation products which are characterized by improved ductility as compared with the unmodified condensation products.

It is an additional object of the invention to provide isocyanate modified oxygen and sulfur condensed hydrocarbons which contain polar groups or radicals.

It is yet another object of the invention to provide an oxygen or sulfur condensed hydrocarbon product modified by reaction with a combination of an isocyanate and an epoxy resin.

It is yet another object of the invention to provide a method for producing isocyanate modified oxygen and sulfur hydrocarbon condensation products.

The invention contemplates isocyanate modified oxygen and sulfur condensed hydrocarbons produced by contacting a hydrocarbon starting material having an ebullioscopic molecular weight of at least about 500, preferably in excess of 800, at a temperature of at least about 400° F., preferably about 425° F. to about 575° F., with a material selected from the group consisting of elemental sulfur and elemental oxygen for a time period requisite to produce an intermediate condensation product having a viscosity at 210° F. of at least 250 Saybolt Universal seconds greater than the viscosity of the said starting material at 210° F., and thereafter reacting said intermediate condensation product with an isocyanate.

All organic compounds including one or more isocyanate groups are contemplated for use in the production of the modified oxygen and sulfur hydrocarbon condensation products of the invention. It is the isocyanate radical which is essential in the invention. The particular organic group to which the isocyanate group is attached is not critical. Generally, the isocyanates contemplated respond to the following generic formula:

I        R-(N=C=O)$_n$ 

In the foregoing formula, R represents any hydrocarbon radical, preferably a hydrocarbon radical containing from one to twenty carbon atoms and $n$ is any integer from one to three inclusive. R can be any saturated or unsaturated, alkyl or aromatic straight or branched chain hydrocarbon radical. Specific hydrocarbon radicals represented by R include straight and branched chain, saturated or unsaturated radicals such as methyl, ethyl, n-butyl, tert.-butyl, hexyl, lauryl, octyl, tetradecyl, hexadecyl, octadecyl, oleyl, eleostearyl, linoleyl; cyclic hydrocarbons such as cyclohexyl, cyclopentyl, decalyl and the like; and aromatic groups such as phenyl, diphenyl, tolyl, phenylene, tolylene, α-naphthyl, β-naphthyl, diphenylmethane, and the like.

Specific isocyanates contemplated by Formula I include n-butyl isocyanate, hexyl isocyanate, octadecyl isocyanate, phenyl isocyanate, ethyl isocyanate, α-naphthyl isocyanate, 2,4-tolylene diisocyanate, 2,6-tolylene diisocyanate, diphenylmethane diisocyanate, ditolylene diisocyanate, 2,4,6-tolylene triisocyanate, triphenylmethane triisocyanate, and the like. Additional compounds within the scope of this invention include polyisocyanates such as those which are formed from organic compounds which have several amine groups within the molecule and which have been reacted in the appropriate fashion with phosgene. Illustrative of compounds of this class are those which are disclosed in U.S. Patent 2,683,730 derived from the condensation product of aniline and formaldehyde which has been treated with phosgene to convert the amino groups to the isocyanate group.

The hydrocarbons contemplated for production of the oxygen and sulfur condensed starting materials useful in the invention embrace all hydrocarbon materials having an ebullioscopic molecular weight of at least about 500, including all of the various appropriate petroleum fractions, essentially pure hydrocarbons, and the like. Preferably, the hydrocarbon starting materials are characterized by an ebullioscopic molecular weight of at least about 1,000. An optimum average ebullioscopic molecular weight range is from about 1,200 to about 1,700.

The most appropriate starting materials for the production of the modified condensation products contemplated by the invention take the form of suitable fractions of crude oils. Appropriate fractions derived from crude oils of any source, including Pennsylvania crude oils, Mid-Continent crude oils, West Coast crude oils, Canadian crude oils, and the like, can be employed. All types of crude oils, including paraffin base crude oils, asphalt base crude oils, and naphthenic crude oils provide suitable sources from which petroleum fractions useful in the production of the modified condensation products of the invention can be derived.

While the invention contemplates the the production of modified condensation products from pure or substantially pure individual hydrocarbons, such materials do not constitute optimum starting materials.

With respect particularly to fractions derived from Pennsylvania crude oils, it is preferred that the hydrocarbon starting materials be characterized by a bromine number not in excess of 10.

It is additionally preferred that hydrocarbons which are utilized as starting materials contain more than about two naphthenic rings per molecule, which rings can be individually integrated with the paraffinic chain portion of the hydrocarbon molecules or condensed with aromatic rings and/or with other naphthenic ring systems. It is also preferred that the hydrocarbon starting materials contain an average of not more than about 50% aromatic carbon atoms. Hydrocarbons which contain an appreciable quantity of highly condensed ring systems, such as those hydrocarbons which are found in the phenol or furfural extracts of lubricating oils, are operable and are most appropriately employed as starting materials for the production of modified condensation products for use as additives for synthetic lubricating oils, such as the various diester oils.

Additionally, it is preferred that the petroleum fractions from which the modified condensation products of the invention are produced contain not more than about 10% of wax type materials. The wax content herein referred to is determinable by a procedure similar to that described under A.S.T.M. designation D–721–51T with the exception that methylisobutyl ketone is employed to precipitate the wax, the sample size is reduced to 0.5 gram, and the determination is conducted at 0° F. While the starting materials which contain substantially more than 10% by weight of wax, as determined by this test, e.g., petrolatum which may reflect a wax content on the order of 40% by weight, can be employed in the production of the viscosity index improving agents of the invention, such materials are not preferred. Such materials can be best used by blending with more desirable starting materials, such as the preferred petroleum fractions above described, in proportions up to about 25% by weight of the total blend.

Normal or vacuum distillation residual stocks and analogous fractions of paraffin base crude oils, such as Pennsylvania crude oils, are highly appropriate starting materials. Hydrocarbons precipitated by conventional propane precipitation process from such residual stocks are particularly suitable.

Further refinement of such propane precipitated, high molecular weight hydrocarbons, which include both light and heavy resin fractions, by extraction with furfural or phenol in conventional manner, yields a raffinate from which modified condensation products of maximum effectiveness, inter alia, as viscosity index improvers, are produced. Conventional solvent extraction processes are utilized to obtain such raffinates. Such processes are well known to the prior art and are described in detail, inter alia, in "Industrial and Engineering Chemistry," 40, pages 220–227 (1948), and at pages 335–336 of "Chemical Refining of Petroleum" by V. A. Kalichevsky and B. A. Stagner, Reinhold Publishing Co. (1942). Generally, the degree of extraction should be such as to yield about a 70% to 85% raffinate. More drastic extraction, for example, to yield 50% to 60% raffinates, may be practiced to obtain still more desirable starting materials for the production of the viscosity index improving agents of the invention.

The most preferred starting material embraces a solvent extracted Pennsylvania crude oil fraction having a molecular weight of from about 1,200 to about 1,700, a bromine number of not more than about 4, which is substantially wax nad asphalt free, which contains not more than about 5% by weight of hydrocarbon molecules containing more than 50% aromatic carbon atoms, and which consists primarily of hydrocarbon molecules containing an average of from about 2 to about 7 naphthenic rings.

The rate of supply of elemental oxygen or elemental sulfur to the condensation reaction mixture is not critical to the production of intermediate stage condensation products. Generally, when elemental oxygen is employed, a free oxygen-containing gas is passed through the condensation reaction mixture at a rate requisite to provide at least about 10 cu. ft., preferably from about 11 to about 27 cu. ft., of oxygen per gallon of hydrocarbon starting material per hour. In the case of air, the corresponding rates are at least about 50 cu. ft. of air per gallon of starting material per hour. The preferred range is from about 55 to 135 cu. ft. of air per gallon of starting material per hour.

In the production of the intermediate sulfur condensation products, at least about 2%, preferably about 10% to about 30%, by weight of sulfur is employed in the condensation reaction pursuant to which the intermediate stage condensation products are produced. Two suitable methods of sulfur addition are hereinafter described.

A first method is to add most of the sulfur, or about 20 to 25 parts by weight of sulfur per 100 parts of hydrocarbon, at room temperature or some temperature below that at which sulfur will readily react with the hydrocarbon, i.e., about 300 to 400° F., preferably 350° F. The temperature is then slowly raised to a temperature of about 450° F. to about 600° F., preferably about 500° F., at a rate so that the foam caused by the hydrogen sulfide generated in the reaction will not overflow the reaction vessel, generally during a time period of about two to four hours or more. A small additional amount of sulfur is then added to increase the ring and ball softening point of the condensation product to a desired number.

A second method entails first heating the hydrocarbon to the reaction temperature, i.e., about 450° F. to about 600° F., preferably about 500° F., followed by the addition of sulfur slowly enough so the foam caused by the generated hydrogen sulfide does not overflow the reaction vessel. This rate is generally about 0.5 to about 2.0, preferably about one part by weight of sulfur per 100 parts by weight of hydrocarbon every 0.25 to 0.50 hour.

About 16 hours or more may be used to effect the condensation, but this extreme length of time is not preferred. It is preferable to limit the time at the elevated temperature to less than 8 hours.

Reactive materials, such as chlorine, hydrogen chloride, phosphorus pentoxide, and like materials, which serve as activators can appropriately be introduced into the reaction mixture in conjunction with the elemental oxygen or sulfur. Conventional catalysts known to the art can be employed.

The substantially oil compatible hydrocarbonaceous condensation products, which are modified in accordance with this invention, appear to result from the chain reaction of free radical intermediates which are formed thermally or by the reaction of at least some of the molecules of the hydrocarbon starting materials with oxygen or sulfur.

Oxygen or sulfur hydrocarbon condensation products are necessary to achieve the purposes of the invention. It will be appreciated that condensation products formed by the joint reaction of sulfur or oxygen with hydrocarbons either sequentially or concurrently are contemplated. Uncondensed hydrocarbon fractions do not appear to be materially affected by treatment with isocyanates in the respects which characterize the modified condensation products of the invention.

Reference is made to copending applications of Lawrence et al. Serial No. 540,159 and Serial No. 559,759 wherein processes for producing oxygen and sulfur condensed hydrocarbons useful in the manufacture of the products of this invention are described.

In accordance with this invention, oxygen or sulfur condensed hydrocarbons or both are reacted with an isocyanate in an amount requisite to effect modification and increase the effectiveness thereof as viscosity index improving agents for mineral oils and for other purposes. Generally, at least about 0.05% by weight, preferably from about 0.25% to about 5% by weight, of isocyanate is employed based on the amount of oxygen or sulfur condensed hydrocarbon or mixture thereof which is utilized. It will be appreciated that as the relative proportion of isocyanate is increased, the degree of modification of the oxygen or sulfur condensed hydrocarbon material is also increased. When relatively highly condensed hydrocarbon materials are employed, particularly in conjunction with relatively large proportions of isocyanate, oil-insoluble, infusible or gelatinous products are produced which are effective as sealants and adhesives.

In accordance with the preferred procedure, to effect modification, the oxygen or sulfur condensation product employed, or mixture thereof, is melted. Generally, a temperature of from about 300° F. to about 500° F. is required to reduce the intermediate stage condensation product to the molten state. Temperatures in excess of about 500° F. are undesirable and may effect some degradation of the product. The isocyanate material to be employed as a reactant is preferably separately heated to a somewhat elevated temperature on the order of about 150° F. to about 250° F., depending upon the specific isocyanate employed. The molten intermediate stage hydrocarbon condensation product is then added to the preheated isocyanate and the reactants are blended together and maintained at a temperature in the range of about 350° F. to about 450° F. for a period of about fifteen minutes to about one hour to complete the reaction.

It will be appreciated that any desired procedure may be employed to produce the novel compositions of this invention.

Inasmuch as many intermediate condensation products are readily workable only at relatively high temperatures, i.e., 450° F. or higher, an alternative method for modifying such products is advantageously employed, particularly when isocyanate compounds are utilized which may be unstable at such high temperatures. Such alternative procedure embraces first blending in appropriate proportions the condensation product which is to be modified with the lubricating oil or other base stock in which it is to be ultimately utilized, followed by the addition of a suitable quantity of isocyanate. More specifically, the condensation products may be mixed in proportions of at least about 10%, preferably from about 20% to 50% by weight, with the ultimate base stock in which they are to be utilized. To the mixture so obtained, there is then added, preferably in small proportions, at least about .05%, preferably about 0.25% to about 5%, by weight of the desired isocyanate based upon the condensation product. Such addition may be effected under an inert atmosphere, if desired. The desired reaction is then effected at a temperature of at least about 150° F., preferably from about 175° F. to 275° F. The ultimate product so obtained is then admixed in appropriate concentration with additional quantities of base stock.

The invention contemplates in a specific embodiment modification of the oxygen or sulfur condensed hydrocarbons jointly with an isocyanate and with an epoxy resin. Epoxy resins are recognized to be long chain polyethers produced by the condensation of alkylidene bis-phenols of the structure:

II 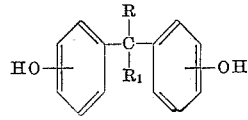

in which R and R₁ are hydrocarbon or substituted hydrocarbon radicals or hydrogen with epichlorohydrin. Epoxy resins generally respond to the following structural formula wherein $n$ is an integer of a value dependent upon the degree of condensation or resinification:

III 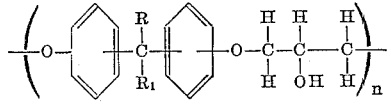

The polymer chain may be terminated at one or both ends by an epoxy group such as the epoxy group responding to the following formula:

IV 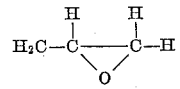

The particular epoxy resin employed does not constitute the essence of the invention which is considered to be generically embracive of the use of such compositions. Representative disclosures of appropriate epoxy resins include U.S. Patents 2,456,408, 2,512,996 and 2,592,560.

In the practice of the invention wherein an epoxy resin is employed, it is preferred to utilize from about 10% to about 20% by weight of the resin based upon the amount of oxygen or sulfur condensed hydrocarbon starting material employed. In the preferred practice, the oxygen and sulfur condensed hydrocarbon starting materials, which are modified with both epoxy resins and isocyanates, are prepared by adding the oxygen or sulfur condensed hydrocarbon starting material in the molten state to a preheated epoxy resin. The isocyanate employed may be added to the condensation products either before or after admixture with the epoxy resin. It is significant that epoxy resins alone are not effective to modify the oxygen and sulfur condensed hydrocarbon products.

The modified condensation products of the invention are usually characterized by a ring and ball softening point, as measured by A.S.T.M. Method E–28–42T, of more than about 80° F. Some modified condensation products comprehended by the invention have a ring and ball softening point or viscosity too low to be effectively measured in accordance with the aforementioned procedure. In any event, the modified condensation products of the invention are characterized by a viscosity of at least about 400 SUS at 210° F., preferably at least about 1,000 to 5,000 SUS at 210° F., and, in all cases, a viscosity of at least about 250 SUS at 210° F. greater than the hydrocarbon starting materials from which the modified condensation products are produced.

The invention further contemplates oleaginous compositions including mineral oil compositions, synthetic lubricating oil compositions, such as polyester type lubricants, and the like, containing the modified condensation products of the invention. In general, the invention contemplates oleaginous compositions of all types containing a small amount sufficient to increase the viscosity index of the modified condensation products of the invention. Generally, from about 0.5% to about 20% by weight, based on the weight of the oleaginous composition, is contemplated.

It has been discovered that the compositions of this invention constitute an excellent medium for blending with lubricating oils and other fluids, various antioxidant and other materials which are insoluble in oils alone and which, therefore, have heretofore been considered unsuitable for use in lubricating oil compositions. Typical of such antioxidants is phenothiazine, and the substituted phenothiazines responding to the following formula:

V

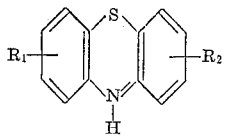

$R_1$ and $R_2$ are hydrogen or alkyl radicals containing not more than 10 carbon atoms including, by way of example, those various specific alkyl radicals specified with respect to Formula I. There can be from 0 to 4 such R substituents in each aromatic nucleus.

Antioxidants, other than phenothiazines, which can be similarly employed, include ascorbic acid, low molecular eight dithiophosphate esters, such as the zinc dithiophosphates of which the zinc salt of n-butyl dithiophosphoric acid is representative, aromatic amines, such as β-naphthylphenylamine, di-β-naphthylamine, diphenyl-p-phenylene diamine, di-βnaphthyl-p-phenylene diamine, mercaptobenzothiazole, and the like.

Any desired method may be employed to incorporate the anti-oxidants with the modified oxygen and sulfur condensation products of the invention. In accordance with one satisfactory method, the modified oxygen or sulfur condensation products are first heated to above the softening point, and the phenothiazine or other antioxidant or material to be incorporated is then blended therewith. The blend so formed is thereafter dissolved or dispersed in a lubricating oil, power transmission fluid, or the like, in conventional manner. In some instances, the antioxidants are added to oil blends of the unheated modified condensation products.

Additional materials which can be incorporated into lubricating compositions through the medium of the modified condensation products of this invention include alkaline earth carbonates, such as those of barium and calcium, the various alkaline earth oxides and hydroxides, boric acid, boric acid esters, and the like.

Also, there may be blended with the oils, power transmission fluids, and the like, containing the modified oxygen and sulfur condensation products of this invention, antioxidants known to be useful in lubricating oil. Typical of such antioxidants are the various phenates, dithiophosphates, amines, phenols, dithiocarbamates, phosphites, and the like. It is the intent of this disclosure to embrace such antioxidants generically. Since these materials are well known to the art, they are not further enumerated here.

It will be appreciated that the condensation products disclosed as being useful, inter alia, as viscosity index improving agents in this invention can be employed in fuel oil materials to prevent the precipitation of solids therefrom as a result of the capability of such condensation products to suspend finely divided solids. A typical example is a blend of virgin distillate gas oil and catalytically cracked fuel oil with at least about 0.05%, preferably about 0.1% to about 5.0% by weight, of the modified condensation product of Example I of this specification.

EXAMPLE I

*Separation from Cylinder Stock of Viscous Hydrocarbons for Use in the Preparation of Modified Condensation Products*

About 75,000 grams of a cylinder stock derived by distillation from paraffin base Pennsylvania crude oil and characterized by a boiling point in excess of about 850° F., a molecular weight of about 750, a viscosity at 210° F. of 225 SUS, an A.P.I. gravity of about 24.8, and a flash point (Cleveland Open Cup) of about 600° F. are mixed with propane heated to a temperature of about 190° F. and then cooled to a temperature of about 65° F. The cylinder stock-propane solution is thereafter transferred into a chilling tank wherein the pressure is reduced to an extent requisite to volatilize sufficient propane to lower the temperature of the solution to about −20° F. to about −50° F. Make up propane is added during the chilling operation, such that the ratio of propane to cylinder stock is about 3 to 1 at the end of the chilling cycle. During the chilling cycle, petrolatum is precipitated from the solution. The chilled cylinder stock-propane solution containing precipitated petrolatum is transferred to a filter feed tank and thence passed through an appropriate filter to effect removal of the petrolatum from the chilled solution.

Propane is added to the filtrate in an amount sufficient to raise the propane-cylinder stock ratio to about 10 to 1 and the temperature of the solution so obtained is elevated to about 150° F. to 180° F. whereupon about 15,000 grams of high molecular weight viscous materials are precipitated. These viscous materials still contain some propane.

The material so obtained is then mixed at a temperature of about 130° F. to 135° F. with additional propane to increase the propane-oil ratio to about 20 to 1. The temperature of the resulting solution is lowered to about 100° F., whereupon about 6,000 grams of viscous hydrocarbons are precipitated. There materials, after removal of all residual propane, are designated as heavy resins and are characterized by a molecular weight of about 1,400, a viscosity of about 4,100 SUS at 210° F., and a bromine number of 3.7.

The remaining oil-propane solution is heated to about 150° F., whereupon 9,000 grams of additional viscous hydrocarbons, which are designated as light resins, are precipitated. Any residual propane is removed in a flash chamber. These hydrocarbons are characterized by a molecular weight of about 1,300, a viscosity of about 1,150 SUS at 210° F., and a bromine number of about 4.0.

A. *Preparation of an Oxygen Condensed Hydrocarbon Material*

About 9,000 grams of the viscous materials separated from the cylinder stock, in the manner described in Example I and designated as light resin, and 1,000 grams of bright stock are charged to a suitable apparatus for air blowing and initially heated to a temperature of 500° F. Air is passed through the mixture at a rate of about 60 cu. ft. per gallon per hour as the temperature is raised. The air blowing is continued at about the same rate for approximately six hours during which time the reaction mixture is maintained at a temperature of about 500° F. to produce a final product characterized by a ring and ball softening point of about 135° F. and a penetration of 116. The bright stock utilized is a fraction of Pennsylvania paraffin base crude oil having a boiling point range exceeding about 850° F. and a viscosity of about 150 SUS at 210° F. obtained by solvent dewaxing and deresining of cylinder stock.

B. *Preparation of a Sulfur Condensed Hydrocarbon Material*

About 9,000 grams of the viscous materials separated from the cylinder stock, in the manner described in Example I and designated as light resin, and 1,000 grams of bright stock are charged to suitable apparatus and initially heated to a temperature of 500° F. Sulfur is introduced into the mixture in increments totaling about 1% of the weight of the mixture as the temperature is raised. The sulfur addition is continued for approximately eight hours until a total amount of sulfur equal to about 22% by weight of the mixture is added, during which time the reaction mixture is maintained at a temperature of approximately 500° F. to produce a final product characterized by a ring and ball softening point of about 135° F. The final product was contacted with air to remove sulfur compounds therefrom and to produce a material non-corrosive to a copper strip when tested pursuant to ASTM Procedure D–130. The bright stock referred to is a fraction of Pennsylvania paraffin base crude oil having a boiling point range greater than about 850° F., a viscosity of about 150 SUS at 210° F. and obtained by solvent dewaxing and deresining of cylinder stock.

EXAMPLE II 100 parts by weight of the oxygen condensed hydrocarbon product described in Example IA are melted at a temperature of about 390° F. in a suitable container and blended with 0.25 part by weight of tolylene diisocyanate which is preheated to a temperature of about 200° F. The resulting blend is maintained at a temperature of about 390° F. for about thirty minutes and agitated thoroughly to effect reaction of the isocyanate with the intermediate stage condensation product. The resulting isocyanate modified intermediate stage oxygen condensation product is characterized by a ring and ball softening point of about 159, a penetration of 96, a ductility of 10 at 77° F. and a ductility of 8.2 at 39.2° F. The product is useful as an adhesive for sealing glass to aluminum, as a sealing composition, and as a viscosity index improving agent for lubricating oils.

A similar product is obtained when there is utilized as a starting material, in lieu of the hydrocarbon-oxygen condensation product, a sulfur condensation product as described in Example IB.

Similar results are obtained with respect to both the intermediate stage oxygen condensation product and the intermediate stage sulfur condensation product when diphenylmethane diisocyanate is employed in lieu of tolylene diisocyanate.

EXAMPLE III

Example II is repeated with the exception that there is employed about 0.5 part by weight of tolylene diisocyanate to produce isocyanate modified materials having a higher ring and ball softening point than the products of Example II.

EXAMPLE IV

An oxygen condensed hydrocarbon is produced in the same manner as that described in Example IA. However, the passage of air through the condensation reaction mixture is continued for a time period requisite to yield a product having a ring and ball softening point of about 149 and a penetration of about 74. 100 parts by weight of the oxygen condensation product so formed is melted at a temperature of about 390° F. in a suitable glass container and blended in the molten state with about 0.25% by weight of tolylene diisocyanate preheated to a temperature of about 200° F. The blend is maintained at a temperature of about 390° F. for about forty minutes with thorough agitation to effect completion of the reaction between the oxygen condensed product and the isocyanate. An isocyanate modified oxygen condensed hydrocarbon product is produced which is characterized by a ring and ball softening point of about 165 and a penetration of about 67. The product so produced is useful as a lubricating oil additive effective to improve the viscosity index of the oil.

Similar results are obtained when there is utilized in lieu of the intermediate stage oxygen condensation product described, an intermediate stage sulfur condensation product prepared in the same manner as described in Example IB, the condensation being continued to an extent requisite to produce an intermediate stage sulfur condensation product having a ring and ball softening point of about 149.

Analogous results are obtained when triphenylmethane triisocyanate is employed in lieu of tolylene diisocyanate.

EXAMPLE V

Example IV is repeated with the exception that there is employed about 0.45 part by weight of tolylene diisocyanate in the preparation of the modified intermediate stage oxygen condensation product to produce an isocyanate modified oxygen condensation product having a ring and ball softening point of about 190 and a penetration of about 57.

The product so produced is added in a concentration of about 5% by weight to a 60 at 100 neutral oil derived from Pennsylvania paraffin base crude by redistillation of a dewaxed primary distillate and characterized by a viscosity at 210° F. of 35.1 SUS and a viscosity index of 88.7 to produce a lubricating oil composition of improved viscosity index.

EXAMPLE VI

Example V is repeated with the exception that there is employed about 0.15 part by weight of tolylene diisocyanate to produce a modified oxygen condensed hydrocarbon product having a ring and ball softening point of about 176 and a penetration of 62.4.

EXAMPLE VII

An oxygen condensed hydrocarbon is produced in the same manner as that described in Example IA with the exception that the passage of air through the reaction mixture is continued for a time period requisite to yield a ring and ball softening point of about 145° F. About 100 parts by weight of the oxygen condensation product so formed is melted at a temperature of about 400° F. and blended in the molten state with about 0.50% by weight of ditolylene diisocyanate preheated to a temperature of about 200° F. The blend is maintained at a temperature of about 400° F. for a period of about thirty minutes with thorough agitation. An isocyanate modified oxygen condensation product is produced which is characterized by a ring and ball softening point of about 170° F.

EXAMPLE VIII

Example VII is repeated with the exception that 0.5% by weight of diphenylmethane diisocyanate is employed in lieu of ditolylene diisocyanate. The resulting isocyanate modified oxygen condensation product is characterized by a ring and ball softening point of about 166° F.

EXAMPLE IX 100 parts of an oxygen condensed hydrocarbon product produced in the same manner as described in Example IA, with the exception that the condensation is continued to a point requisite to produce an intermediate stage product having a ring and ball softening point of about 191 and a penetration of about 61, are melted at a temperature of about 380° F. and blended in the molten state with about 0.25 part by weight of tolylene diisocyanate, preheated to a temperature of about 200° F. The blend is maintained at a temperature of about 360° F. for about thirty minutes and agitated to facilitate reaction between the isocyanate and the intermediate stage condensation product. The isocyanate modified oxygen condensed hydrocarbon product so produced is characterized by a ring and ball softening point of about 240 and a penetration of about 53.

The composition so produced is subjected to a tensile strength test designed to evaluate the effectiveness of the material as an adhesive for use in sealing dual pane windows. More specifically, an aluminum strip ⁵⁄₁₆ inch wide by ¼ inch thick by 4 inches long is sealed between two 1 x 4 inch pieces of plate glass by placing ¹⁄₁₆ inch threads of adhesive composition along the ⁵⁄₁₆ inch long by 4 inch faces of the aluminum, assembling the glass and aluminum and pressing the assembly for 24 hours with a twenty pound load, care being taken to maintain the elements of the assembly parallel. After pressing, the assembly is pulled apart in a tensile testing machine of conventional design, using a pulling rate of 1 cm. per minute. In this test, with the composition produced by this example, a load of 125 lbs. was reached before the adhesive bond broke; the break was cohesive rather than adhesive with about 98% of the glass interface remaining covered, and about 95% of the aluminum interface remaining covered with the film of the compound.

An analogous product is obtained when an intermediate stage sulfur condensation product, produced in the manner described in Example IB and having a ring and ball softening point of about 190, is employed.

Utilization of other isocyanates including ditolylene isocyanate, dianisidine diisocyanate, and polyphenyl polyisocyanate yield similar products. The polyphenyl polyisocyanate is the condensation product resulting from the reaction of aniline and formaldehyde which has been subsequently reacted with phosgene and is characterized by an average molecular weight of about 384.

EXAMPLE X

An oxygen condensed hydrocarbon having a ring and ball softening point of about 170 and produced in a manner analogous to that described in Example IA is blended in the molten state at a temperature of about 390° F. with about 0.5% by weight of tolylene diisocyanate preheated to a temperature of about 200° F. The blend was maintained at a temperature of about 390° F. for about thirty minutes with agitation to facilitate reaction between the isocyanate and the oxygen condensed hydrocarbon. The isocyanate modified condensation product is characterized by a ring and ball softening point of about 238 and a penetration of about 41.8. The product is blended in a proportion of about 5% by weight with a 60 at 100 neutral oil of the type described in Example V to produce a motor oil of improved viscosity index.

Similar results are obtained when a sulfur condensed hydrocarbon having a ring and ball softening point of about 170 is utilized as a starting material in lieu of the oxygen condensed hydrocarbon described.

EXAMPLE XI

Example X is repeated with the exception that about 0.15% by weight of tolylene diisocyanate is employed to produce an isocyanate modified product having a ring and ball softening point of about 198 and a penetration of about 50. Analogous or similar results are obtained when ditolylene diisocyanate or diphenylmethane diisocyanate is employed in lieu of tolylene diisocyanate.

EXAMPLE XII

An oxygen condensed hydrocarbon produced in the same manner as that described in Example IA, with the exception that the air blowing is continued to produce an intermediate stage condensation product having a ring and ball softening point of 157 and a penetration of about 75, is reacted in the molten state at a temperature of about 400° F. for about thirty minutes with about 0.5% by weight of tolylene diisocyanate vacuum stripped to remove volatile components and cooled. The isocyanate modified condensation product is characterized by a ring and ball softening point of about 223 and a penetration of about 49, and is employed as an adhesive effective to bond aluminum to glass.

The isocyanate modified intermediate stage oxygen condensation product is also effective when blended in minor proportion, such as about 5% by weight, with a 60 at 100 neutral oil, of the type described in Example V, to produce an oil product of improved viscosity index.

Similar results are obtained when there is employed as a starting material a sulfur condensed hydrocarbon having a ring and ball softening point of about 157 and prepared in a manner analogous to that described in Example IB in lieu of the oxygen condensed hydrocarbon product described in this example.

EXAMPLE XIII 100 parts by weight of the sulfur condensed hydrocarbon described in Example IB are blended in the molten state at a temperature of about 380° F. with 0.75 part by weight of tolylene diisocyanate and the blend is maintained at a temperature of about 380° F. for about 30 minutes to produce an isocyanate modified sulfur condensed hydrocarbon product having a ring and ball softening point of about 219 and a penetration of about 22. The isocyanate modified product is blended in a proportion of about 5% by weight with the 60 at 100 neutral oil described in Example V to produce an oil of improved viscosity index.

The isocyanate modified product is also useful as an adhesive, for example, in the bonding of aluminum to glass.

EXAMPLE XIV

About 100 parts by weight of an intermediate stage oxygen condensation product produced in the manner described in Example IA, with the exception that the air blowing is continued for a time period requisite to yield an intermediate product having a ring and ball softening point of about 239 and a penetration of about 44, are blended in the molten state at a temperature of about 380° F. with about 1% by weight of tolylene diisocyanate preheated to a temperature of about 200° F. The reaction mixture is maintained at a temperature of about 380° F. for about thirty minutes. The resulting product which is infusible, oil-insoluble, and characterized by a penetration of about 32, is useful as an adhesive to bond aluminum to glass. An aluminum-glass structure bonded with the isocyanate modified product of this example failed under a load of 133 pounds and demonstrated better adhesion to the glass surface than did the unmodified product. In the case of the unmodified product, the break was mainly in the glass surface, only about 20% of the adhesive material remaining on the glass after the break, whereas in the case of the modified product, there is essentially no stripping of the adhesive from the glass surface although about 50% of the aluminum surface is stripped.

EXAMPLE XV

About 100 parts by weight of an oxygen condensed hydrocarbon having a ring and ball softening point of about 180 to 200 and produced in the same manner as the intermediate stage oxygen condensation product described in Example IA is blended in the molten state at about 380° F. with about 1% by weight of tolylene diisocyanate preheated to a temperature of about 200° F. The mixture is maintained at a temperature of about 360° F. for about one-half hour and cooled to produce a product having a needle penetration at 77° F. of 37, a ductility at 77° F. of 5.6, and a ductility at 39.2° F. of 4.4. The isocyanate modified product is an effective viscosity index improving agent for lubricating oils.

EXAMPLE XVI

About 100 parts by weight of an oxygen condensed hydrocarbon having a ring and ball softening point of about 190 and produced in a manner similar to that described in Example IA is blended with about one part by weight of a liquid epoxy resin and about 0.25 part by weight of tolylene diisocyanate at a temperature of about 380° F. The reaction mixture is maintained at a temperature of 380° F. for about thirty minutes. The final modified product so produced is gelatinous at the 380° F. curing temperature. The penetration of the product is about 50, the ductility at 77° F. is 4.3 and the ductility at 39.2° F. is 3.7. After standing for four days, it was found that the material is gelatinous and infusible. The product is an effective sealer and adhesive.

A similar reaction in which tolylene diisocyanate is omitted does not have the penetration or softening point of the intermediate stage oxygen condensation product utilized.

The liquid epoxy resin employed is a liquid product known commercially as Epon 834 available from Shell Chemical Company.

EXAMPLE XVII

It is the purpose of this example to demonstrate that uncondensed hydrocarbon materials cannot be effectively modified with isocyanates. More specifically, about 100 parts by weight of the viscous materials designated as light resin Example I were blended in the molten state at a temperature of about 380° F. with about 0.25 part by weight of tolylene diisocyanate preheated to a temperature of about 200° F. The mixture was maintained at a temperature of about 390° F. for a period of about 30 minutes with agitation to facilitate reaction. No significant change in the physical properties of the product, as compared with the hydrocarbon starting material, are discernible.

EXAMPLE XVIII

An oxygen condenser hydrocarbon product is prepared in a manner analogous to that described in Example IA with the exception that the blowing process is terminated at a point requisite to provide a final product having a ring and ball softening point of about 180 to 200° F. 311.8 parts by weight of the oxygen condensed product so obtained are heated to a temperature of about 400° F. and 0.78 part by weight of tolylene diisocyanate is added. The temperature of the mixture is maintained at 400° F. with agitation for about 20 minutes, during which time the reaction mixture is thickened. The product so obtained is characterized by a ring and ball softening point of about 245° F. This material, when blended in the proportion of about 10% by weight with the 60 at 100 neutral oil described in Example V, raises the viscosity index of the oil from about 88.7 to about 163.0.

EXAMPLE XIX

An oxygen condensed hydrocarbon product similar to the product of Example IX but having a ring and ball softening point of about 190° F. is mixed with an equal weight of naphtha. To 90 parts by weight of this mixture there is added about 10 parts by weight of asbestos. There is then added about 0.1% by weight tolylene diisocyanate to this mixture and the resulting composition baked in an oven at 300° F. for about 25 minutes. The resulting product is a foamed resin.

As appears from the foregoing Example XIX, the invention contemplates the production of thermosetting resinous materials and the addition of inert filler materials both of fibrous character, such as asbestos, and non-fibrous character, such as aggregate materials, and the like. The invention further contemplates the production of foamed resinous compositions as illustrated by heating the isocyanate modified condensation products of the invention to an elevated temperature of at least about 300° F., for a period of time requisite to induce the desired foaming, generally from about 10 to about 60 minutes.

We claim:

1. A tacky adhesive condensation product produced by contacting a petroleum hydrocarbon starting material having an ebullioscopic molecular weight of at least about 500, at a temperature of at least about 400° F., with a material selected from the group consisting of elemental sulfur and elemental oxygen for a time period requisite to produce an intermediate condensation product having a viscosity at 210° F. of at least 250 Saybolt Universal seconds greater than the viscosity of the said starting material at 210° F. and essentially free of acid, and thereafter reacting said intermediate condensation product with an organic isocyanate.

2. The composition of claim 1 wherein said organic isocyante responds to the formula R(̵N=C=O)̵$_n$ wherein R is a hydrocarbon radical containing from one to twenty carbon atoms and wherein $n$ is an integer.

3. The composition of claim 1 wherein the organic isocyanate with which the intermediate condensation product is reacted is a tolylene diisocyanate.

4. The composition of claim 1 wherein the organic isocyanate with which the intermediate condensation product is reacted is diphenylmethane diisocyanate.

5. The composition of claim 1 wherein the organic isocyanate with which the intermediate condensation product is reacted is triphenylmethane triisocyanate.

6. The composition of claim 1 wherein said material is oxygen.

7. The composition of claim 1 wherein said material is sulfur.

8. The composition of claim 1 wherein said organic isocyanate is employed in an amount equal to at least about 0.05% by weight of said intermediate condensation product.

9. The composition of claim 1 wherein said organic isocyanate is employed in an amount of from about 0.25% to about 5% by weight of said intermediate condensation product.

10. The method of producing a tacky adhesive hydrocarbon condensation product which comprises melting with a first condensation product formed by condensing a petroleum hydrocarbon having an ebullioscopic molecular weight of at least about 500 at a temperature of about at least 400° F. with a material selected from the group consisting of sulfur and oxygen to produce a condensation product essentially free of acid and blending said molten first condensation product with an organic isocyanate to effect reaction between said organic isocyanate and said first condensation product to produce a final condensation product having a viscosity of at least about 250 SUS at 210° F. greater than the hydrocarbon starting material from which said first condensation product is produced.

11. The method of producing a tacky adhesive hydrocarbon condensation product which comprises contacting a petroleum hydrocarbon starting material having an ebullioscopic molecular weight of at least about 500 at a temperature of at least about 400° F. with a material selected from the group consisting of elemental sulfur and elemental oxygen for a time period requisite to produce an intermediate condensation product having a viscosity at 210° F. of at least 250 SUS greater than the viscosity of said starting material at 210° F. and essentially free of acid and thereafter reacting said intermediate condensation product with an organic isocyanate.

12. The process of claim 11 wherein the organic isocyanate responds to the formula R(̵N=C=O)̵$_n$ wherein R is a hydrocarbon radical containing from one to twenty carbon atoms and wherein $n$ is an integer.

13. A tacky adhesive condensation product produced by contacting a petroleum hydrocarbon starting material having an ebullioscopic molecular weight of at least about 500 at a temperature of at least about 400° F. with a material selected from the group consisting of elemental sulfur and elemental oxygen to produce a first condensation product essentially free of acid, and thereafter reacting said first condensation product with a mixture of an organic isocyanate and a 1,2-epoxy resin.

14. The condensation product of claim 13 wherein said organic isocyanate responds to the formula R(̵N=C=O)̵$_n$ wherein R is a hydrocarbon radical containing from one to twenty carbon atoms and wherein $n$ is an integer.

15. A tacky adhesive hydrocarbonaceous condensation product having a combined oxygen content not in excess of about 5% by weight, said condensation product being produced by contacting a petroleum fraction starting material in which the hydrocarbons present have an ebullioscopic molecular weight in excess of about 500, while at a temperature of at least about 400° F., with a free oxygen-containing gas and being essentially free of acid, and thereafter reacting the condensate so produced with an organic isocyanate responding to the formula $$R(N\!=\!C\!=\!O)_n$$

in which R is an alkyl group containing from one to twenty carbon atoms, and $n$ is any integer from 1 to 3 inclusive, to produce a final product effective in a concentration of about 10% by weight to increase the viscosity index of a standard base mineral oil, derived from a paraffinic crude source, at least ten viscosity index units more than a like amount of the hydrocarbon starting material from which said condensation product is formed.

16. The condensation product of claim 15 wherein said organic isocyanate which is reacted with said condensation is a tolylene diisocyanate.

17. The condensation product of claim 15 produced by contacting said starting material with air.

18. The condensation product of claim 13 produced by contacting said starting material with sulfur.

References Cited in the file of this patent

UNITED STATES PATENTS

| | | |
|---|---|---|
| 1,896,227 | Egloff | Feb. 7, 1933 |
| 2,122,826 | Peski | July 5, 1938 |
| 2,257,328 | Bray | Sept. 30, 1941 |
| 2,340,331 | Knutson | Feb. 1, 1944 |
| 2,447,004 | Gamson | Aug. 17, 1948 |
| 2,728,787 | Hurwitz | Dec. 27, 1955 |
| 2,890,125 | Mange | June 9, 1959 |

FOREIGN PATENTS

| | | |
|---|---|---|
| 763,347 | Great Britain | Dec. 12, 1956 |
| 852,882 | Germany | Oct. 20, 1952 |

OTHER REFERENCES

Van Nostrand Chemist's Dictionary, published by Van Nostrand, Inc., New York (1953), page 267 relied upon.

UNITED STATES PATENT OFFICE
CERTIFICATE OF CORRECTION

Patent No. 3,038,873　　　　　　　　　　　　　　　June 12, 1962

Franklin I. L. Lawrence et al.

It is hereby certified that error appears in the above numbered patent requiring correction and that the said Letters Patent should read as corrected below.

Column 3, line 18, strike out "the", second occurrence; line 65, for "process" read -- processes --; column 4, line 15, for "nad" read -- and --; line 73, for "this" read -- his --; column 7, line 22, for "eight" read -- weight --; column 8, line 29, for "There" read -- These --; column 10, line 69, strike out "long".

Signed and sealed this 9th day of October 1962.

(SEAL)
Attest:

ERNEST W. SWIDER
Attesting Officer

DAVID L. LADD
Commissioner of Patents